(12) United States Patent
Koseki et al.

(10) Patent No.: US 7,219,334 B2
(45) Date of Patent: May 15, 2007

(54) PROGRAM CONVERSION METHOD, DATA PROCESSING APPARATUS AND PROGRAM

(75) Inventors: Akira Koseki, Sagamihara (JP); Kiyokuni Kawachiya, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 10/375,761

(22) Filed: Feb. 26, 2003

(65) Prior Publication Data
US 2003/0177479 A1 Sep. 18, 2003

(30) Foreign Application Priority Data
Feb. 27, 2002 (JP) ............................. 2002-051246

(51) Int. Cl.
*G06F 9/44* (2006.01)
(52) U.S. Cl. ...................... 717/131; 717/127; 717/140
(58) Field of Classification Search ......... 717/127–157
See application file for complete search history.

(56) References Cited

U.S. PATENT DOCUMENTS 5,428,793 A * 6/1995 Odnert et al. ............... 717/157
2002/0166115 A1* 11/2002 Sastry ......................... 717/151
2004/0103410 A1* 5/2004 Sakai .......................... 717/146

* cited by examiner

*Primary Examiner*—Meng-Al T. An
*Assistant Examiner*—Mark P. Francis
(74) *Attorney, Agent, or Firm*—Cantor Colburn LLP

(57) ABSTRACT

To save and restore the contents of registers efficiently and enhance the execution efficiency of compilation. For a predetermined variable in an executable program, a determination is made whether or not the variable lives across invoking of a predetermined function, and if so, the kind of invoking of the function is determined. The variable is allocated to any of volatile registers, non-volatile registers, and semi-volatile registers, based on this determination. Also, it is determined to which register the variable living across invoking of the function is allocated, based on an execution frequency of the function when the executable program is run.

21 Claims, 9 Drawing Sheets

Fig. 4

| | Invoking of external function | Invoking of function generated by compiler 100 |
|---|---|---|
| Volatile register | Destructed | Destructed |
| Semi-volatile register | Reserved | Destructed |
| Non-volatile register | Reserved | Reserved |

PROGRAM CONVERSION METHOD, DATA PROCESSING APPARATUS AND PROGRAM

FIELD OF THE INVENTION

The present invention relates to allocation of a register that is performed in compiling a computer program.

BACKGROUND ART

A computer program (hereinafter simply referred to as a program) is made up as an aggregate of a plurality of functions (methods). When the program is compiled, a compiler allocates a register to each of the functions constituting the program, using the same register set. Accordingly, if the value of the register lives beyond a function call in a predetermined portion of the program, it is necessary that the value of the register is reserved temporarily in memory.

By the way, the registers provided by the CPU include volatile registers of which register values are not reserved if a function is executed, and non-volatile registers of which register values are reserved if a function is executed.

Thus, if the register value lives beyond a function call in a certain portion of the program, there are two methods for evacuating the register value as follows. One of the methods is a so-called caller-saved method for allocating variables to the volatile registers to save the register values before invoking of a function, and restore the registers after return, whereby the register values are saved and restored.

Another method is a so-called caller-saved method for allocating variables to the non-volatile registers to save the register values before the use of the registers and restore the register values after the use in the called function, whereby the register values are saved and restored.

Classification of the non-volatile register and the volatile register is defined by the supplier of the machine (CPU), as the calling convention for using the register. Accordingly, the developer of the software system must develop the system in conformance with this calling convention.

In the conventional system development, the volatile register was allocated to the variables that do not live across a function, and the non-volatile register was allocated to the variables that live across a function, in accordance with the convention for using the register established by the machine supplier. As a variation of implementation, there is a method for allocating the volatile registers to the variables living before and after the function, but is not considered to be rational except for the special situation where the non-volatile registers are not supplied.

In the case where there are a plurality of systems inter-linkable by software, each system usually generates code in accordance with the calling convention of using the non-volatile register and the volatile register, as described in the paragraph of the prior art. This presupposes that the systems are interlinked or invoke functions from each other.

Herein, one of the interlinkable systems is a JIT (Just In Time) compiler, in the relationship between code generated by the JIT compiler and an external function for object generation, the code generated by the JIT compiler invokes the external function in usual cases, but the opposite case is very rare. In this case, the register treated as the non-volatile register in the external function is not necessarily saved within the JIT compiler. However, conventionally, the non-volatile registers defined by the machine supplier are employed directly as the non-volatile register stationarily in JIT, whereby the essentially unnecessary contents of the register were saved and restored.

As above described, the non-volatile registers are allocated to the variables living across a function. This is because there are a greater number of favorable code patterns by allocating the variables to the non-volatile registers rather than allocating the variables to the volatile registers. That is, if the variables living across the function are allocated to the volatile registers, the registers are saved and restored by the number of functions invoked while the variable is defined and used lastly in the worst case, whereas when the variables are allocated to the non-volatile registers, the registers are necessary to be saved and restored at most once outside the living duration of the variable. However, if there is any variable living across the function, the function may be rarely invoked. And with the conventional method, the variables are allocated to the non-volatile registers, whereby the contents of the registers before and after the living duration of variables were saved and restored almost uselessly.

SUMMARY OF THE INVENTION

Thus, it is an aspect of the present invention to save and restore the contents of registers efficiently by allocating the variables living across the function to the registers with an improved method. In order to achieve this aspect, the present invention is implemented as program conversion (compiling) methods and apparatus for controlling a computer to generate machine language code by compiling source code of an executable program. The said method comprising the steps of: determining whether or not predetermined variables of said executable program to be an objective for processing live across predetermined invoking of a function; determining whether the invoking of the function corresponds to invoking of a function generated by the compiler or corresponds to invoking of an external function if the variable lives across the invoking of the function; determining based on the determination registers for allocation of the variables, the register being selected from volatile registers, non-volatile registers, and semi-volatile registers of which register values are reserved during execution of the invoking of the external function and one destructed during execution of a function generated by the compiler; and generating machine language code based on the determination.

Also, another program conversion method of the invention comprises the steps of: examining the execution frequency of a function comprising the executable program, when the executable program is run; storing the execution frequency in memory; determining, for a predetermined variable in the executable program, depending on the execution frequency to which of a volatile register or a non-volatile register to allocate the variable, when the predetermined variable lives across predetermined invoking of a function; and generating the machine language code in response to determined register allocation.

Also, a further program conversion method of the invention comprises the steps of examining the execution frequency of a function comprising the executable program, when the executable program is run, and storing the execution frequency in memory, determining, for a predetermined variable in the executable program, depending on the execution frequency, which code is added thereto, from code that the variable to be allocated to a register is saved and restored before and after the invoking of the function, or code that the variable to be allocated is saved and restored in the invoked function, when the predetermined variable lives across predetermined invoking of a function and generating the machine language code in response to determined register allocation and storing it in memory.

Moreover, a still further program conversion method of the invention, comprises the steps of categorizing variables in the executable program to be an objective for processing into classes A, B and C, the classes of variables being defined to Class A in which living duration of variables extends before and after a function frequently executed and generated by the compiler, to Class B in which living duration of variables extends before and after an external function frequently executed and does no extend before and after a function frequently executed and generated by the compiler, and to C group in which variables are to be other than the two Classes; allocating the variables categorized into Class A to non-volatile registers; allocating the variables categorized into Class B to semi-volatile registers of which register values are reserved during execution of invoking of the external function and are destructed during execution of invoking of a function generated by the compiler; allocating the variables categorized into Class C to volatile registers; and generating the machine language code in response to determined register allocation.

The present invention is also implemented as a data processing apparatus for reading source code of an executable program and converting the source code into machine language code. The apparatus comprising a logical register allocating part for allocating logical registers to variables in the executable program, a logical register characteristics analysis part for analyzing whether or not predetermined variables live across predetermined invoking of functions, and when the variables live across the invoking of the functions, further analyzing whether or not the invoking of the functions is to be invoking of functions generated by the compiler or whether or not the invoking of the functions is to be invoking of external functions, a physical register allocation part for allocating the variables to any one of the registers, based on the analysis results, the registers comprising volatile registers, non-volatile registers, and semi-volatile registers of which register values are reserved during execution of the invoking of the external functions and are destructed during execution of the invoking of functions generated by the compiler, and machine language code generating part for generating the machine language code by referring to the determination of the register allocation.

Moreover, another data processing apparatus of the invention comprises a register allocation part for allocating variables in the executable program to a volatile register or a non-volatile register when the variables live across predetermined invocation of functions, depending on execution frequency, a saving and restoring information generation part for generating information for adding to the executable program code for saving and restoring variables allocated to the volatile registers before and after invocation of functions, and for adding to the executable program code for saving and restoring variables allocated to non-volatile registers within invoked functions, and a code generation part for generating the machine language code based on the generated information.

Still further, the invention is implemented as a program for controlling a computer to execute the processing corresponding to each step of the program conversion method, or to realize each function of the data processing apparatus (e.g., a compiler such as JIT compiler in Java® that dynamically compiles the executable program). This program can be provided by storing and distributing it in a magnetic disk, an optical disk, semiconductor memory, or other storage medium, or transmitting it via a network.

DESCRIPTION OF THE DRAWINGS

These and other aspects, features, and advantages of the present invention will become apparent upon further consideration of the following detailed description of the invention when read in conjunction with the drawing figures, in which:

FIG. 4 is a table listing a sort and characteristic of registers used in this embodiment;

DESCRIPTION OF SYMBOLS

Figure 1:
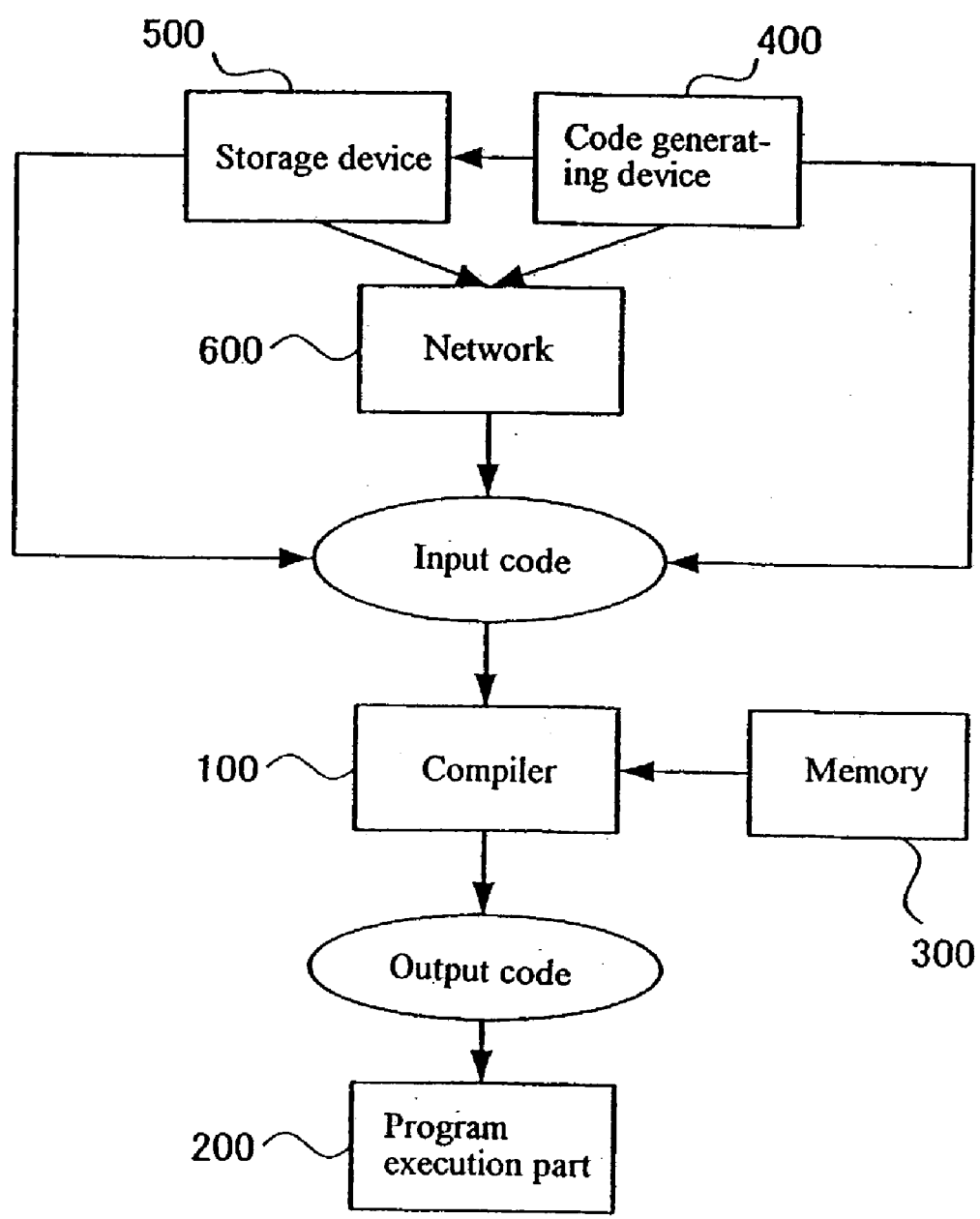
FIG. 1 is a block diagram showing a system configuration of a computer system for implementing a data processing method according to an embodiment of the invention.

100 . . . Compiler
110 . . . Logical register allocation part
120 . . . Logical register characteristics analysis part
130 . . . Physical register allocation part
140 . . . Saving and restoring information generation part
150 . . . Code generation part
200 . . . Program execution part
300 . . . Memory

DESCRIPTION OF THE INVENTION

The present invention provides methods, apparatus and systems for program conversion (compiling) method for controlling a computer to generate machine language code by compiling source code of an executable program. In an example embodiment, the method includes the steps of determining whether or not predetermined variables of said executable program to be an objective for processing live across predetermined invocation of a function; determining whether the invocation of the function corresponds to invocation of a function generated by the compiler or corresponds to invocation of an external function if the variable lives across the invocation of the function; determining, based on the determination, registers for allocation of the variables, wherein the register are selected from volatile registers, non-volatile registers, and semi-volatile registers of which register values are reserved during execution of the invocation of the external function and one destructed during execution of a function generated by the compiler; and generating machine language code based on the determination.

Herein, the step of determining the allocation of a variable sometimes comprises allocating the variable to the semi-volatile register if the living duration of predetermined variable extends after invoking of external functions alone (i.e., does not extend after invoking of the function generated by the compiler).

An alternate embodiment of another program conversion method of the invention comprises the steps of: examining the execution frequency of a function comprising the executable program, when the executable program is run; storing the execution frequency in memory; determining, for a predetermined variable in the executable program, depending on the execution frequency to which of a volatile register or a non-volatile register to allocate the variable, when the predetermined variable lives across predetermined invocation of a function; and generating the machine language code in response to determined register allocation.

Herein, the step of determining the allocation of this variable sometimes comprises allocating this variable to the volatile register, when the living duration of predetermined variable extends after invocation of the function with low execution frequency.

A further embodiment of a program conversion method of the invention comprises the steps of: examining the execution frequency of a function comprising the executable program, when the executable program is run, and storing the execution frequency in memory; determining, for a predetermined variable in the executable program, depending on the execution frequency, which code is added thereto, from code that the variable to be allocated to a register is saved and restored before and after the invocation of the function, or code that the variable to be allocated is saved and restored in the invoked function; when the predetermined variable lives across predetermined invocation of a function and generating the machine language code in response to determined register allocation and storing it in memory.

Herein, the step of determining the allocation of this variable sometimes comprises adding the code that the variable is saved and restored in the invoked function, when the living duration of the predetermined variable allocated to the register extends after invocation of the function with low execution frequency.

Moreover, a still further embodiment of a program conversion method of the present invention comprises the steps of: categorizing variables in the executable program to be an objective for processing into classes A, B and C, the classes of variables being defined to Class A in which living duration of variables extends before and after a function frequently executed and generated by the compiler, to Class B in which living duration of variables extends before and after an external function frequently executed and does no extend before and after a function frequently executed and generated by the compiler, and to C group in which variables are to be other than the two Classes; allocating the variables categorized into Class A to non-volatile registers; allocating the variables categorized into Class B to semi-volatile registers of which register values are reserved during execution of invoking the external function and destructed during execution of invoking of a function generated by the compiler; allocating the variables categorized into Class C to volatile registers; and generating the machine language code in response to determined register allocation.

The present invention is also implemented as a data processing apparatus for reading source code of an executable program and converting the source code into machine language code. The apparatus comprising a logical register allocating part for allocating logical registers to variables in the executable program, a logical register characteristics analysis part for analyzing whether or not predetermined variables live across predetermined invoking of functions, and when the variables live across the invoking of the functions, further analyzing whether or not the invoking of the functions is to be invoking functions generated by the compiler or whether or not the invoking of the functions is to be invoking external functions; a physical register allocation part for allocating the variables to any one of the registers, based on the analysis results, the registers comprising volatile registers, non-volatile registers, and semi-volatile registers of which register values are reserved during execution of the invocation of the external functions and are destructed during execution of the invocation of functions generated by the compiler; and machine language code generating part for generating the machine language code by referring to the determination of the register allocation.

In another embodiment of a data processing apparatus, the invention comprises a register allocation part for allocating variables in the executable program to a volatile register or a non-volatile register when the variables live across predetermined invocation of functions, depending on execution frequency; a saving and restoring information generation part for generating information for adding to the executable program code for saving and restoring variables allocated to the volatile registers before and after invocation of functions; and for adding to the executable program code for saving and restoring variables allocated to non-volatile registers within invoked functions, and a code generation part for generating the machine language code based on the generated information.

In a still further embodiment, the invention is implemented as a program for controlling a computer to execute the processing corresponding to each step of the program conversion method, or to realize each function of the data processing apparatus (e.g., a compiler such as JIT compiler in Java® that dynamically compiles the executable program). This program can be provided by storing and distributing it in a magnetic disk, an optical disk, semiconductor memory, or other storage medium, or transmitting it via a network.

Advantageous embodiments of the present invention will be described below in detail with reference to the accompanying drawings. FIG. 1 is a block diagram showing the system configuration of a computer system for implementing a data processing method according to an embodiment of the invention. Referring to FIG. 1, the computer system of this embodiment comprises a compiler 100 for compiling a source program (input code), a program execution part 200 for executing an object program (output code) compiled by the compiler 100 to perform various processings, and memory 300. The compiler 100 and the program execution part 200 are implemented by a CPU that is program controlled in the computer system such as a personal computer or a workstation. The memory 300 is main memory for the computer, which is implemented by a RAM or the like. The memory 300 stores an operation program for the compiler 100 operating under the control of the CPU and a program to be compiled, and temporarily stores the variables saved from the registers in a compilation of the compiler 100. The program stored in the memory 300 may be appropriately saved in a magnetic disk or other external storage units, as needed.

In FIG. 1, the compiler 100 inputs and processes an input code described in a byte code and generates and outputs an output code described in a machine language. The input of this input code can be made directly from a code generating device 400, from a storage device 500 storing the input code generated by the code generating device 400, or via a network 600 from the code generating device 400 or the storage device 500 residing on the network 600. The output code generated by the compiler 100 is executed by the program execution part 200.

In this embodiment, the compiler 100 dynamically performs a compilation of the executable program in executing the executable program, like a JIT compiler for Java®. In this embodiment, the JIT compiler for Java® will be exemplified below. The program execution part 200 executes an object code (machine language code) of the executable program that is compiled by the compiler 100, or executes the executable program by means of an interpreter. And when the executable program is run, its execution profile (hereinafter simply referred to as a profile) is acquired and stored in the memory 300.

Figure 2:
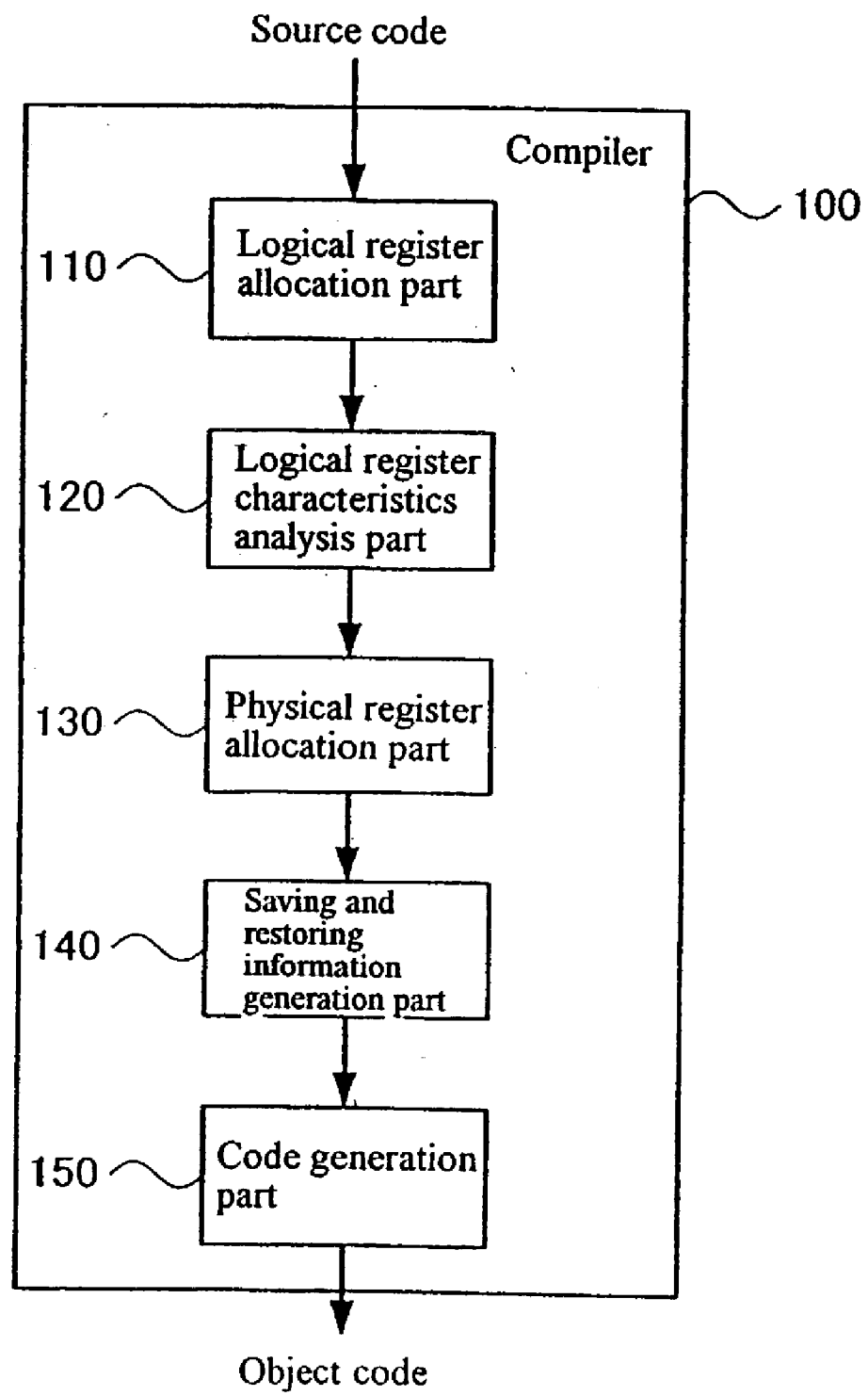
FIG. 2 is a block diagram for explaining the configuration of a compiler in this embodiment.

FIG. 2 is a block diagram for explaining the configuration of the compiler 100 in this embodiment. Referring to FIG. 2, the compiler 100 comprises a logical register allocation part 110 for allocating a logical register to the program to be compiled, a logical register characteristics analysis part 120 for analyzing the allocated variables of which the living duration extends before and after the functions, a physical register allocation part 130 for mapping logical register to a physical register based on the results of analysis by the logical register characteristics analysis part 120, a saving and restoring information generation part 140 for generating the information of saving and restoring each physical register based on the result of mapping by the physical register allocation part 130, and a code generation part 150 for generating an object code in response to the information generated by the saving and restoring information generation part 140.

Each component of the compiler 100 as shown in FIG. 2 is a virtual software block that is implemented by the CPU controlled by a computer program. The computer program for controlling the CPU is provided by storing and distributing it in the recording medium such as a CD-ROM or floppy disk or transmitting it via the network.

The components of the compiler 100 as shown in FIG. 2 are feature functions in this embodiment. Though not shown, the compiler 100 has typical functions in the compilation, such as lexical analysis or syntax analysis for the input code, and various optimization processes. In this embodiment, when a variable in the program lived after and before invocation of the function, the variable is allocated to the register by the following two methods to save and restore efficiently the variable that is the register value. One method involves employing the semi-volatile register defined in this embodiment, and the other method involves employing the frequency of invoking the function using the variable.

1. Method of Employing the Semi-Volatile Register
   Introduction of Semi-Volatile Register In the dynamic compilation performed by the JIT compiler for Java®, the compiler 100 dynamically generates an object code during execution of a program, and uses the object code only during execution of the program. Accordingly, since it is possible to completely grasp whether or not there is invoking from an external function, if the non-volatile registers are saved at the time of invoking from the external function, the non-volatile registers can be changed into the volatile registers at will in the code generated by the compiler 100. In a stationary execution state of the program, there is rarely invoking from the external function, whereby there is virtually no disadvantage in changing the non-volatile registers to the volatile registers.

Thus, part of the non-volatile registers defined by the machine are employed as the volatile registers within the code generated by the compiler 100. Herein, the register employed in this manner is referred to as a semi-volatile register. The semi-volatile register is treated as follows.

(1) The semi-volatile register used as the volatile register within the code generated by the compiler 100 is determined from among the predetermined non-volatile registers. The number of semi-volatile registers may be arbitrary within the number of volatile registers.

(2) The semi-volatile register is saved at a point where the code generated by the compiler 100 is invoked from the outside. For example, in a mixed-mode execution environment where interpreter and compiler are mixed, when the interpreter invokes the code generated by the compiler 100, the contents of the semi-volatile register are saved.

Figure 3:
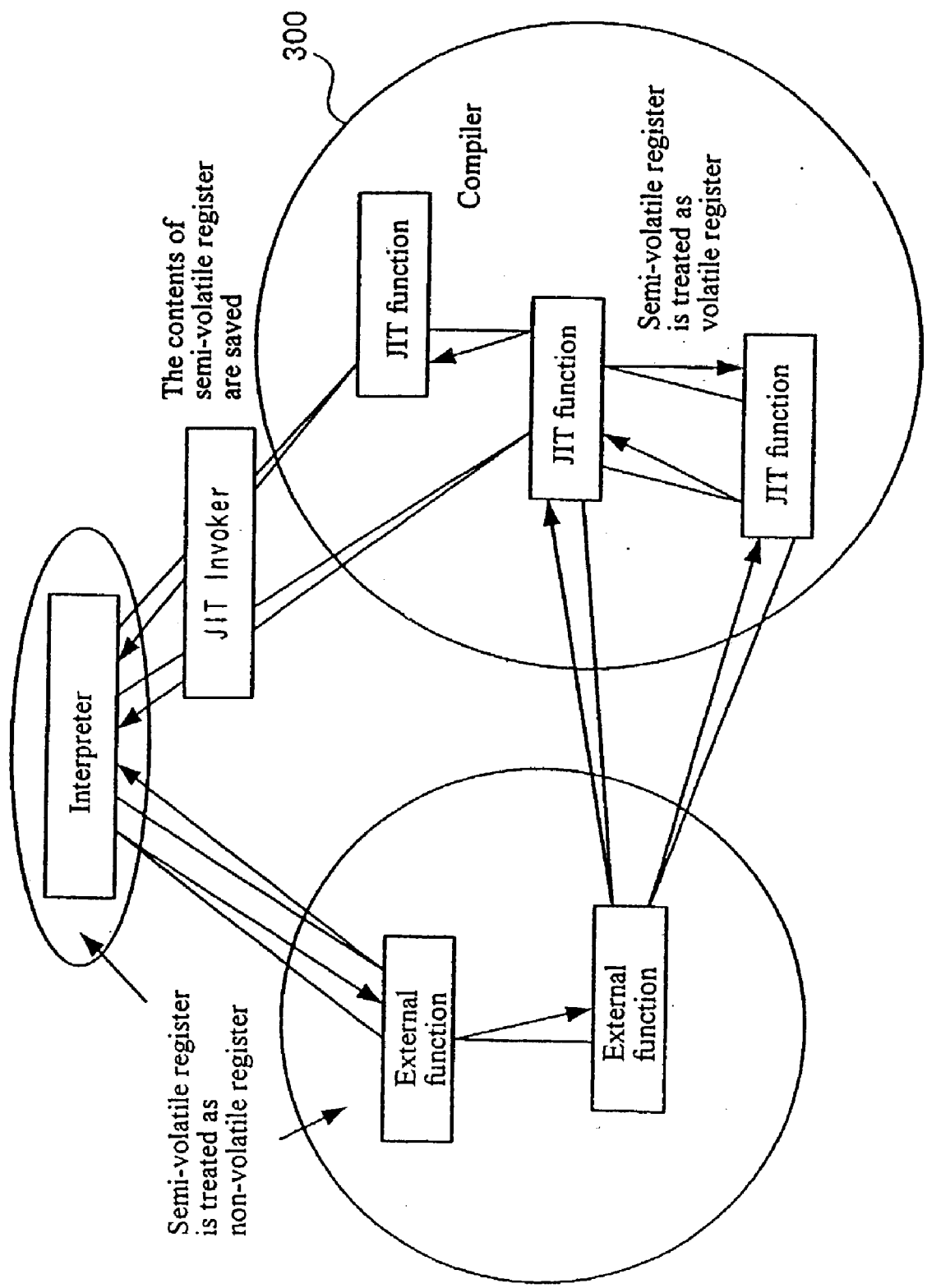
FIG. 3 is a diagram showing invocation of functions in a mixed-mode execution environment where interpreter and compiler are mixed.

FIG. 3 is a diagram showing invocation of functions in a mixed-mode execution environment where interpreter and compiler are mixed. In FIG. 3, the semi-volatile register is treated as the volatile register within the code (JIT function in the figure) generated by the compiler 100, or the non-volatile register in executing the interpreter and the external function. When the code generated by the compiler 100 invokes the external function, the function is directly invoked, whereas when the external function invokes the code generated by the compiler 100, the function is invoked via the interpreter and the JIT Invoker, whereby the contents of the semi-volatile register are saved.

Reducing the Number of Steps of Saving and Restoring the Contents of the Register Using the Semi-Volatile Register FIG. 4 is a table listing the sort and characteristic of the registers. As listed in FIG. 4, by introduction of the semi-volatile register, there are three sorts of the register, including the volatile register, the semi-volatile register and the non-volatile register. These registers are employed depending on the kind of variable in the program. That is, by analysis of the program, the variables are classified into those in which the living duration extends before and after the function, those in which the living duration extends before and after the function generated by the compiler 100, and those in which the living duration extends before and after the external function but does not extend before and after the function generated by the compiler 100. Among them, the variables in which living duration does not extend before and after the function are allocated to the volatile registers, and the variables in which living duration extends before and after the function generated by the compiler 100 are allocated to the non-volatile registers, as usually made. And the variables in which living duration extends before and after the external function but does not extend before and after the function generated by the compiler 100 are allocated to the semi-volatile registers.

Figure 5:
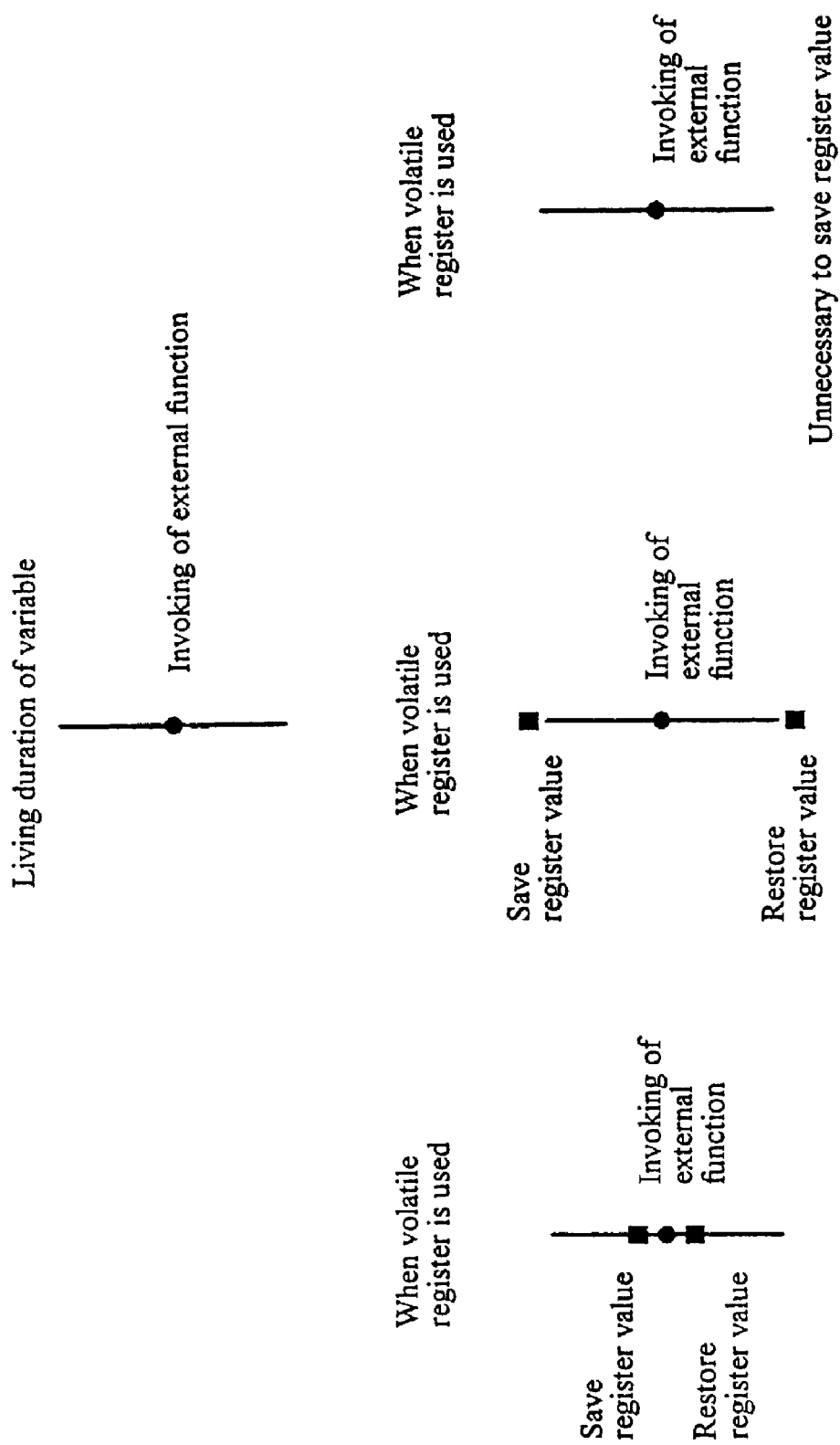
FIG. 5 is a diagram describing saving and restoring the contents of registers required for the variables in which living duration extends before and after an external function but does not extend before and after a function generated by the compiler.

FIG. 5 is a diagram for explaining the step of saving and restoring the contents of the registers required for the variables in which living duration extends before and after the external function but does not extend before and after the function generated by the compiler 100. The variables in which living duration extends before and after the external function but does not extend before and after the function generated by the compiler 100 are allocated to the semi-volatile registers, whereby those variables can be allocated to the registers within the code generated by the compiler 100 without saving and restoring the contents of the register, as shown in FIG. 5. On one hand, in the conventional register allocation, when those variables were allocated to the volatile registers, it was necessary to save and restore the contents of the register across invocation of function, whereas when those variables were allocated to the non-volatile registers, it was necessary to save and restore the contents of the register before and after using the register. Accordingly, the execution efficiency of compilation is enhanced by reducing the number of saving and restoring the contents of the register.

2. Method for Considering the Frequency of Invoking the Function Using the Variable Since it is supposed that the variables in which living duration extends before and after the function are allocated to the non-volatile registers to produce a greater number of favorable code patterns, the variables of this kind are normally allocated to the non-volatile registers. However, if the variable extending before and after the function rarely invoked is allocated to the non-volatile register, it is useless to save and restore the contents of the register before and after the living duration of that variable.

Thus, for a predetermined variable, a determination is made whether or not the invoking of the function over which that variable extends is rarely performed, employing the information of profile, and the allocated register is selected based on the result of determination. That is, if all the functions over which the variable extends are rarely executed, that variable is allocated to the volatile register, whereby the contents of the register are saved before invoking of the function, and the contents of the register are restored after return (saving and restoring the register value by the caller-saved method).

On one hand, if at least one of the functions over which the variable extends is frequently executed, its variable is allocated to the non-volatile register, whereby the contents of the register are saved before using the register, and the contents of the register are restored after use (saving and restoring the register value by the caller-saved method).

Figure 6:
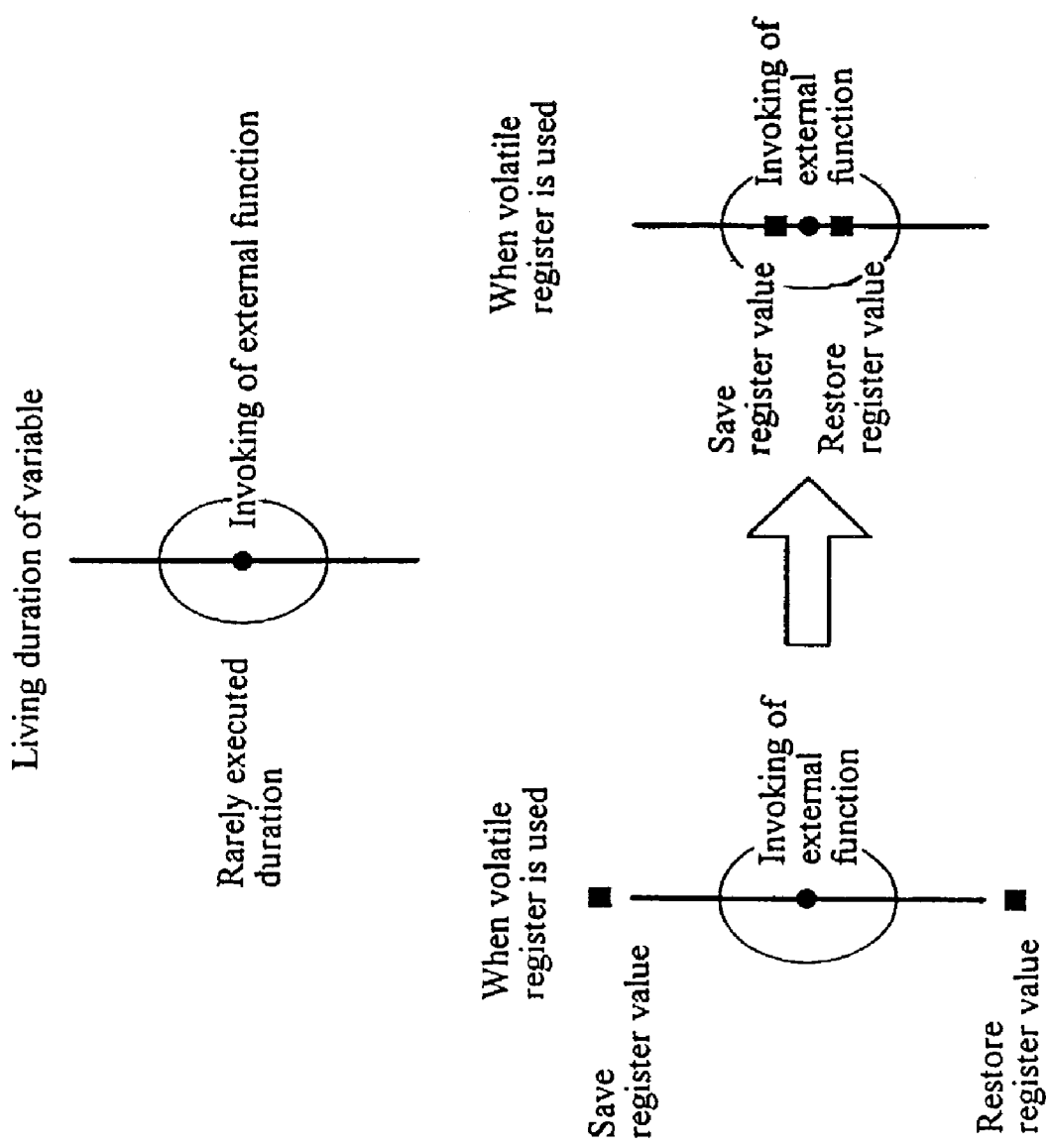
FIG. 6 is a diagram describing saving and restoring the contents of registers by allocating the registers depending on the execution frequency of a function.

FIG. 6 is a diagram for explaining to save and restore the contents of the registers by allocating the registers depending on the execution frequency of function. As shown in FIG. 6, in consideration of the execution frequency of function, the position of saving and restoring the register value extending before and after the rarely executed function is changed from before and after the living duration of that register to before and after the function over which living duration extends. Since this function is rarely executed, saving and restoring before and after the function are rarely made. Namely, the cost of saving and restoring the contents of the register is virtually cut back.

Integrating the above methods 1 and 2, the following criteria are required to select the register to which the function in the program is allocated. That is, (1) Does the living duration of variable extend before and after the function (code) generated by the compiler 100?

(2) Does the living duration of variable extend before and after the external function?

(3) Occurrence frequency of invoking the function itself over which the living duration of variable extends.

In consideration of various combinations of these criteria, there are following three categories of variable for determining the register to be allocated in this embodiment.

Class A: Variables of which living duration extends before and after the function generated by the compiler 100 on the frequently executed path.

Class B: Variables of which living duration extends before and after the external function on the frequently executed path and does no extend before and after the function generated by the compiler 100 on the frequently executed path (those variables may or may not extend before and after all the functions generated by the compiler 100 on the rarely executed path).

Class C: Other variables (which may or may not extend before and after all the functions on the rarely executed path).

The operation of each component will be described below, when the above methods as offered in this embodiment are implemented by the compiler 100 as shown in FIGS. 1 and 2.

In the configuration of the compiler 100 as shown in FIG. 2, the logical register allocation part 110 allocates a logical register to a program read from the memory 300, and preprocessed for syntax analysis in the conventional manner. Also, the code generation part 150 generates an object code in the conventional manner, and stores the generated object code in the memory 300.

The logical register characteristics analysis part 120 analyzes the living duration of variable allocated to each logical register extending over the function in the following manner.

Figure 7:
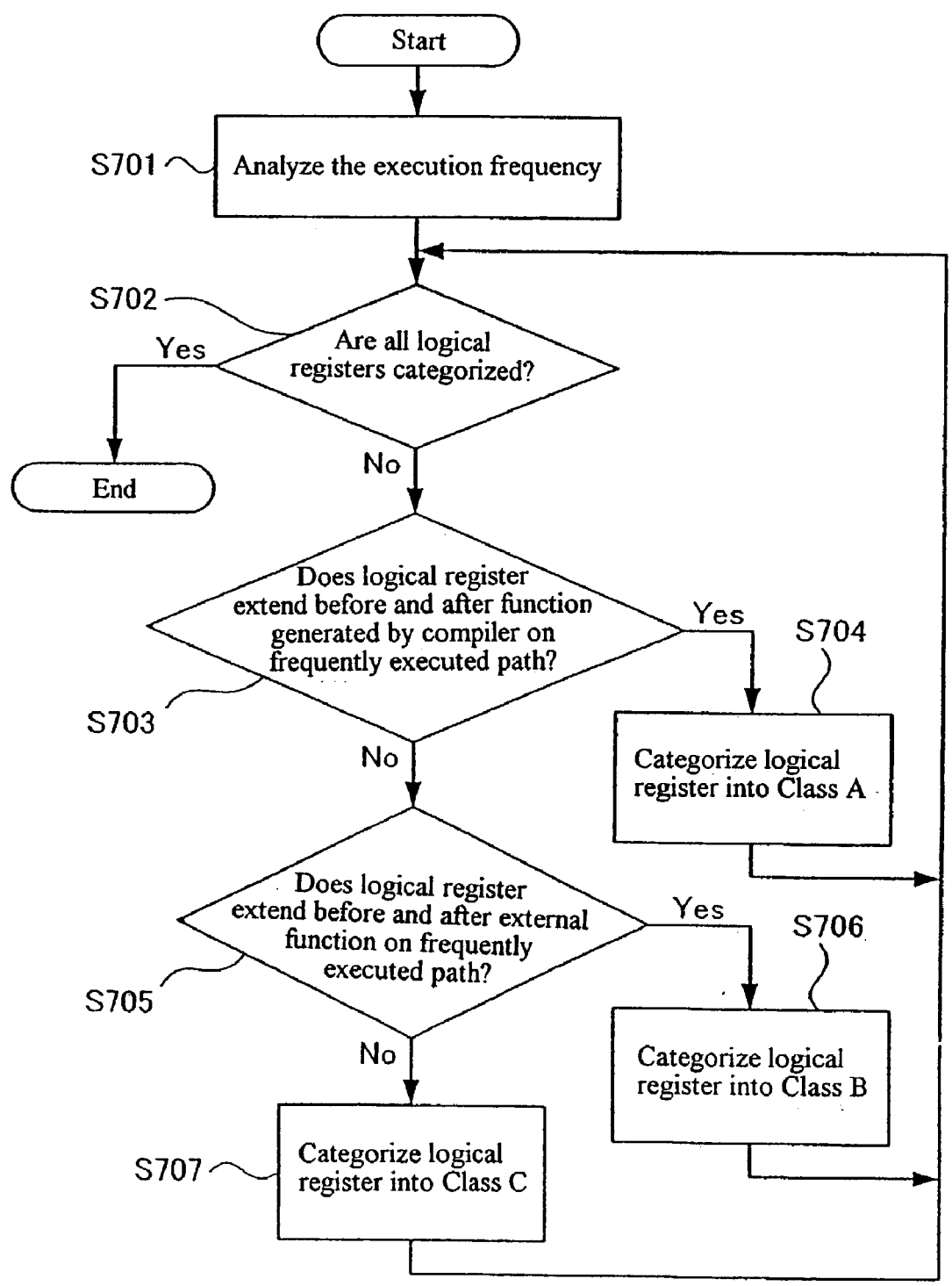
FIG. 7 is a flowchart for explaining the operation of an analysis process of a logical register characteristics analysis part.

FIG. 7 is a flowchart for explaining the operation of an analysis process of the logical register characteristics analysis part 120. Though not specifically shown, it is supposed that when the program to be compiled is executed after the process of interpreter or compilation by the program execution part 200, its profile is acquired and stored in the memory 300. Referring to FIG. 7, the logical register characteristic analysis part 120 acquires the information for profile stored in the memory 300 for all the functions, and analyzes the execution frequency of path where that function resides (rarely executed path or frequently executed path), employing this information (step 701). Then, the following process is performed in succession for all the logical registers (step 702).

Firstly, for a logical register of notice, a determination is made whether or not the living duration of the logical register extends before and after the function generated by the compiler 100 on the frequently executed path (step 703). If so, the logical register is categorized into Class A (step 704). Then, a determination is made whether or not the living duration of that logical register extends before and after the external function on the frequently executed path (step 705). If so, the logical register is categorized into Class B (step 706).

Further, if the living duration of the logical register extends before and after all the functions on the rarely executed path or does not extend before and after the functions at all, the logical register is categorized into Class C (step 707). It is assured that the logical register is categorized into any one of Classes A, B and C owing to the characteristics of the logical register.

If the above process is performed for all the logical registers, the processing of the logical register characteristics analysis part 120 is ended (step 702).

The physical register allocation part 130 makes a mapping from the logical register to the physical register, based on the results of analysis by the logical register characteristics analysis part 120.

Figure 8:
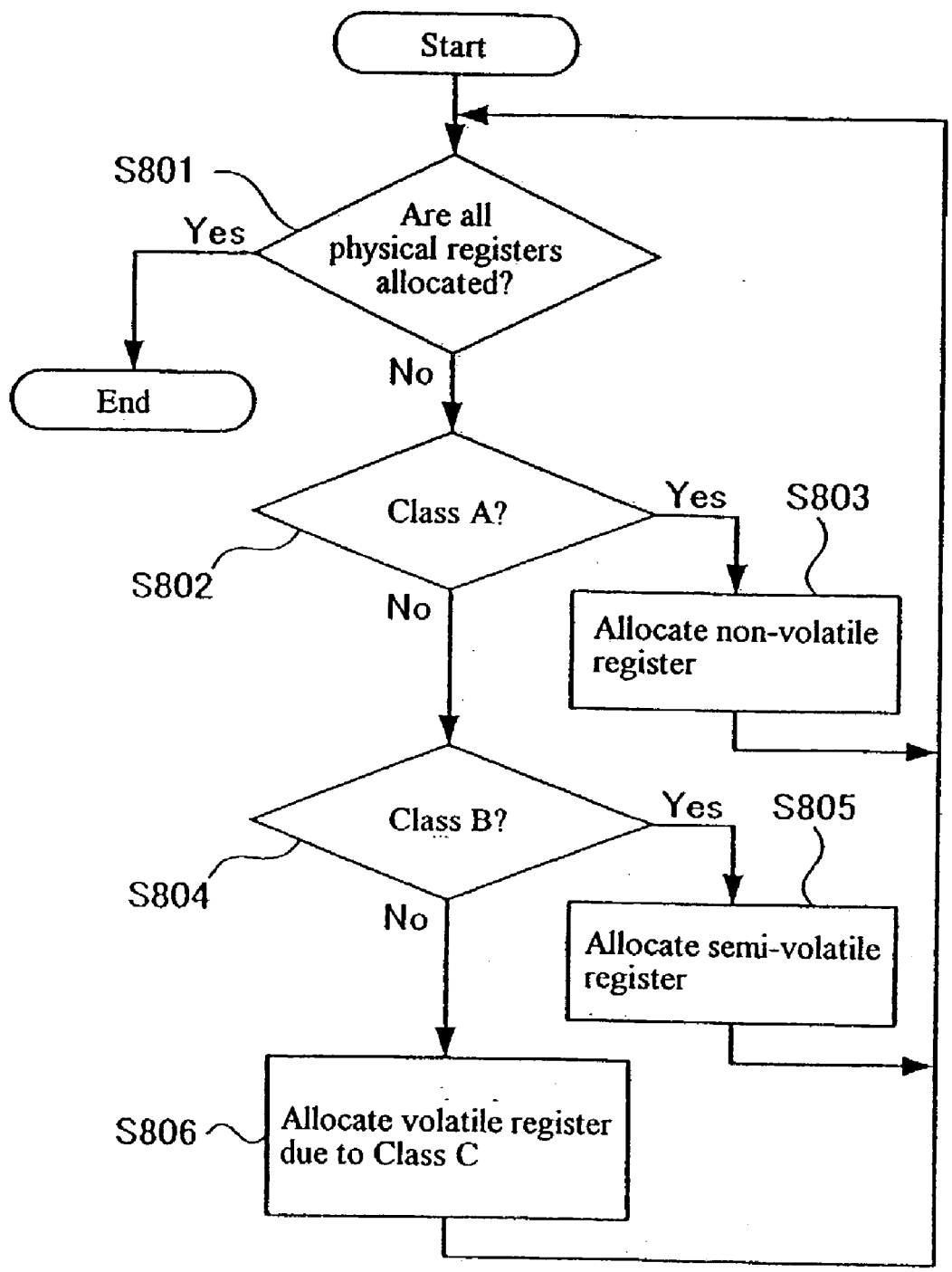
FIG. 8 is a flowchart for explaining the operation of a mapping process of a physical register allocation part.

FIG. 8 is a flowchart for explaining the operation of a mapping process of the physical register allocation part 130. Referring to FIG. 8, the physical register allocation part 130 performs the following steps in succession for each logical register (step 801).

Firstly, if the logical register of notice is categorized into Class A, the logical register is allocated to the non-volatile register (steps 802 and 803). Then, if the logical register is categorized into Class B, the logical register is allocated to the semi-volatile register (steps 804 and 805).

Further, if the logical register is categorized into Class C, the logical register is allocated to the volatile register (step 806). If the above processing is performed for all the logical registers, the process of the physical register allocation part 130 is ended (step 801). The saving and restoring information generation part 140 generates the information for saving and restoring each physical register, based on the result of mapping by the physical register allocation part 130.

Figure 9:
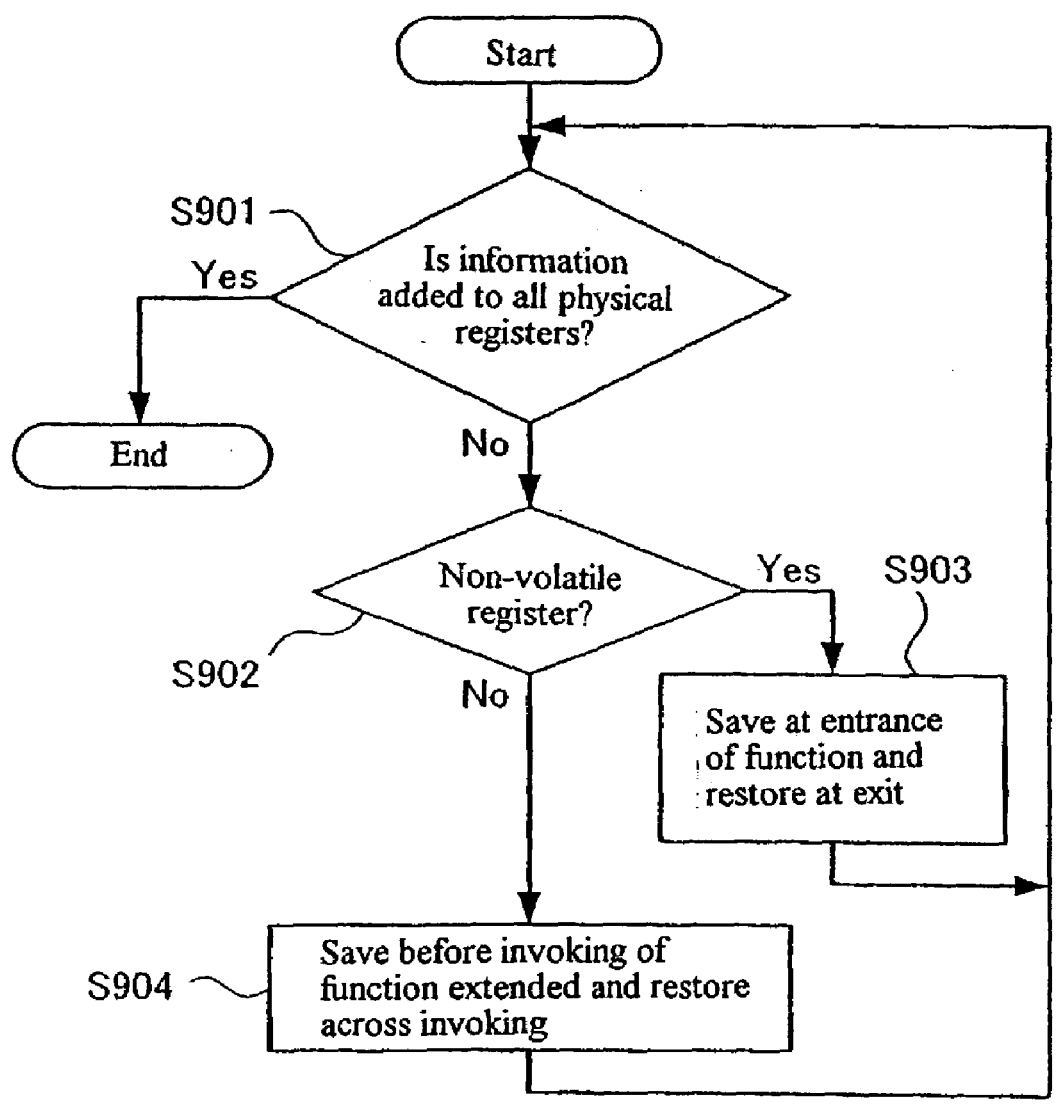
FIG. 9 is a flowchart for explaining the operation of an information generating process of a saving and restoring information generation part.

FIG. 9 is a flowchart for explaining the operation of an information generating process of the saving and restoring information generation part 140. Referring to FIG. 9, the saving and restoring information generation part 140 performs the following steps in succession for each physical register allocated by the physical register allocation part 130 (step 901). Firstly, if a physical register of notice is the non-volatile register, the information indicating that the contents of the physical register are saved in the memory is added to the entrance of a method to be compiled, and the information indicating that the contents of the physical register are restored from the memory is added to the exit (steps 902 and 903).

Then, if the physical register is the semi-volatile register or the volatile register, the information indicating that the contents of the logical register are saved into the memory before invoking the function is added to each function over which the living duration of variable allocated to the physical register extends and the information indicating that the contents of the logical register are restored from the memory after invoking the function is added to each logical register (step 904).

If the above steps are performed for all the logical registers, the process of the saving and restoring information generation part 140 is ended (step 901). Thereafter, the actually saved and restored code is generated in the process of generating the object code by the code generation part 150, based on the information generated by the saving and restoring information generation part 140.

As above described, with this invention, the contents of the register are saved and restored efficiently and the execution efficiency of compilation is enhanced.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A program conversion method comprising: controlling a computer to generate machine language code by compiling source code of an executable program, comprising the steps of:

reading from memory said executable program to be an objective for processing, determining whether or not predetermined variables of said executable program live across predetermined invoking of a function, and determining whether said invoking of said function corresponds to invoking of a function generated by the compiler or corresponds to invoking of an external function if said variable lives across said invoking of said function;

determining based on determination registers for allocation of said variables, a register being selected from:
a volatile register of which register value is destructed during execution of said invoking of said function,
a non-volatile register of which register value is reserved during execution of said invoking of said function, and
a semi-volatile register of which register value is reserved during execution of said invoking of said external function and is destructed during execution of a function generated by said compiler, wherein an arbitrary number of said semi-volatile registers are created from a preexisting number of said non-volatile registers; and
generating machine language code based on said determination to store in memory.

2. A program conversion method comprising: controlling a computer to read source code of an executable program and convert said source code into machine language code, comprising the steps of:
examining an execution frequency of a function comprising said executable program, when said executable program is run, and storing said execution frequency in memory;
reading from said memory said execution frequency of said function when a predetermined variable in said executable program lives across predetermined invoking of a function, and determining, depending on said execution frequency a volatile register or a non-volatile register to which said variable is allocated, wherein said variable is allocated to said volatile register in the event that a determination is made that a function is rarely executed, and further said volatile register destroying a register value upon invoking of a function and said non-volatile register reserving a register value upon invoking of a function; and
generating the machine language code in response to determined register allocation, and storing it in said memory.

3. A program conversion method comprising controlling a computer to read source code of an executable program and convert said source code into machine language code, comprising the steps of:
examining an execution frequency of a function comprising said executable program, when said executable program is run, and storing said execution frequency in memory;
reading from said memory said execution frequency of said function when a predetermined variable in said executable program lives across predetermined invoking of a function and determining, depending on said execution frequency, which codes are added thereto, from code that said variable to be allocated to a register is saved or restored before and across said invoking of said function in the event that a determination is made that a function has rarely been executed, or code that said variable to be allocated is saved or restored in said invoked function; and
generating the machine language code in response to determined register allocation and storing it in said memory.

4. A program conversion method comprising: controlling a computer to generate machine language code by compiling source code of an executable program, comprising the steps of:
categorizing variables in said executable program into classes A, B and C, said classes of variables being defined to Class A in which living duration of variables extends before and after a function frequently executed and generated by said compiler, to Class B in which living duration of variables extends before and after an external function frequently executed and does no extend before and after a function frequently executed and generated by said compiler, and to C group in which variables are to be other than said Classes A and B;
allocating said variables categorized into Class A to a non-volatile register of which register value is reserved during execution of invoking of functions,
allocating said variables categorized into Class B to a semi-volatile register of which register value is reserved during execution of invoking of said external function and is destructed during execution of invoking of a function generated by said compiler, wherein an arbitrary number of semi-volatile registers are created from a preexisting number of non-volatile registers, and
allocating said variables categorized into Class C to a volatile register of which register value is destructed during execution of invoking of functions; and
generating the machine language code in response to determined register allocation and storing it in said memory.

5. A data processing apparatus for reading source code of an executable program and converting said source code into machine language code, said apparatus comprising:
a logical register allocating part for allocating logical registers to variables in said executable program;
a logical register characteristics analysis part for analyzing whether or not predetermined variables live across predetermined invoking of functions, and when said variables live across said invoking of said functions, further analyzing whether or not said invoking of said functions is to be invoking of functions generated by said compiler or whether or not said invoking of said functions is to be invoking of external functions;
a physical register allocation part for allocating said variables to any one of the registers, based on results from said logical register characteristics analysis part, said registers comprising volatile registers of which register values are destructed during execution of said invoking of said functions, non-volatile registers of which register values are reserved during execution of said invoking of said functions, and semi-volatile registers of which register values are reserved during execution of said invoking of said external functions or is destructed during execution of said invoking of functions generated by the compiler, wherein an arbitrary number of semi-volatile registers are created from a preexisting number of non-volatile registers; and
a machine language code generating part for generating the machine language code by referring to said determination of the resistor allocation in said physical register allocation part.

6. A data processing apparatus for reading source code of an executable program and converting said source code into machine language code, said apparatus comprising:
a register allocation part for allocating variables in said executable program to a volatile register or a non-volatile register when said variables live across predetermined invoking of functions, depending on an execution frequency, wherein said variable is allocated to said volatile register in the event that a determination is made that said function is rarely executed, said volatile register destroying register values therein during execution of said invoking of said function, or said non-volatile register reserving register values therein during execution of said invoking of said functions;

a saving and restoring information generation part for generating information for adding to said executable program code for saving and restoring variables allocated to said volatile register before and after invoking of functions, and for adding to said executable program code for saving and restoring variables allocated to said non-volatile register within invoked functions; and a code generation part for generating the machine language code based on said information generated in said saving and restoring information generation part.

7. A program for controlling a computer to allocate registers to variables in a predetermined executable program, said program executing the processes of:

determining whether or not a predetermined variable of said executable program lives across predetermined invoking of functions and determining whether said invoking of said functions corresponds to invoking of a function generated by said compiler or to invoking of an external function, if said variable lives across said invoking of said function; and allocating, based on said determination, said variable to any one of volatile registers of which register values are destructed during execution of said invoking of said function, non-volatile registers of which register values are reserved during execution of said invoking of said function, and semi-volatile registers of which register values are reserved during of execution of said invoking of said external function or is destructed during execution of said invoking of a function generated by said complier, wherein an arbitary number of said semi-volatile registers are created from preexisting number of siad non-volatile registers.

8. The program as recited in claim 7, wherein the process of said program for determining the allocation of said variable comprises allocating said variables to said semi-volatile registers, if the living duration of the predetermined variable extends before and after the invoking of external functions alone.

9. A program for controlling a computer to allocate registers to variables in a predetermined executable program, said program executing the processes of:

determining whether or not a predetermined variable of said executable program lives across predetermined invoking of functions and determining whether said invoking of said functions corresponds to invoking of a function generated by said compiler or to invoking of an external function, if said variable lives across said invoking of said function, extracting variables in said executable program so that a living duration extends before and after an external function, and does not extend before and after functions generated by said compiler; and allocating extracted variables to semi-volatile registers of which register values are reserved during execution of said invoking of said external function and are destructed during execution of said invoking of a function generated by the compiler, wherein an arbitrary number of said semi-volatile registers are created from a preexisting number of said non-volatile registers.

10. A program fur controlling a computer to allocate registers to variables in a predetermined executable program, said program executing the processes of:

examining an execution frequency of a function comprising said executable program, when said executable program is run, and storing said execution frequency in memory;

acquiring the information regarding an execution frequency of a function comprising said executable program when said executable program is run; and allocating variables in said executable program to any one of volatile registers or non-volatile registers when variables live across a predetermined invoking of functions, depending on execution frequency, wherein said variable is allocated to said volatile register in the event that a determination is made that a function is rarely executed, said volatile register not reserving the register values therein during execution of said invoking of said functions, and said non-volatile register reserving the register values therein during execution of said invoking of said function.

11. The program as recited in claim 10, wherein the process of said program for determining the allocation of said variable comprises allocating said variable to said volatile register, if the living duration of said predetermined variable extends before and after the invoking of a function with low execution frequency.

12. A program for controlling a computer to allocate registers to variables in a predetermined executable program, said program executing the processes of:

examining an execution frequency of a function comprising said executable program, when said executable program is run, and storing said execution frequency in memory;

acquiring the information regarding an execution frequency of a function comprising said executable program when said executable program is run; and adding at least one piece of code to said executable program, when said variables live across a predetermined invoking of functions, depending on execution frequency, said code comprising code for saving and restoring variables allocated to said register before and after invoking of functions in the event that a determination is made that said functions have rarely been executed, and code for saving and restoring variables within invoked functions.

13. The program as recited in claim 12, wherein the process of said program for determining the allocation of said variable comprises adding code for saving and restoring said variable within the invoked function to said executable program, if the living duration of said predetermined variable allocated to the register extends before and after invoking of a function with low execution frequency.

14. A program for controlling a computer to allocate registers to variables in a predetermined executable program, said program executing the processes of:

categorizing variables in said executable program into classes A, B and C, said classes of variables being defined to:

Class A in which living duration of variables extends before and after a function frequently executed and generated by said compiler, Class B in which living duration of variables extends before and after an external function frequently executed and does no extend before and after a function frequently executed and generated by the compiler, and C group in which variables are to be other than said two Classes; and allocating said variables categorized into Class A to a non-volatile register of which register value is reserved during execution of invoking of functions, allocating said variables categorized into Class B to a semi-volatile register of which register value is reserved during execution of invoking of said external function and is destructed during execution of invoking of a function generated by said compiler, wherein an arbitrary number of semi-volatile registers are created from a preexisting number of non-volatile registers, and allocating said variables categorized into Class C to a volatile register of which register value is destructed during execution of invoking of functions.

15. The program as recited in claim 14, wherein said program is a compiler that dynamically compiles said executable program when the computer executes said executable program.

16. A computer readable recording medium in which a program for controlling a computer to allocate registers to variables in a predetermined executable program, said program executing the processes of:

determining whether or not a predetermined variable of said executable program lives across predetermined invoking of functions and determining whether said invoking of said functions corresponds to invoking of a function generated by the compiler or to invoking of an external function if said variable lives across said invoking of said function; and allocating said variable, based on said determination, said register being selected from a volatile register of which register value is destructed during execution of said invoking of said function, a non-volatile register of which register value is reserved during execution of said invoking of said function, and a semi-volatile register of which register value is reserved during execution of said invoking of said external function and is destructed during execution of said invoking of a function generated by said compiler, wherein an arbitrary number of said semi-volatile registers are created from a preexisting number of said non-volatile registers.

17. A computer readable recording medium in which a program for controlling a computer to allocate registers to variables in a predetermined executable program, said program executing the processes of:

examining an execution frequency of a function comprising said executable program, when said executable program is run, and storing said execution frequency in memory;

acquiring the information regarding an execution frequency of a function comprising said executable program when said executable program is run; and allocating a variable in said executable program to a volatile register of which register value is destructed during execution of the invoking of a function, wherein said variable is allocated to said volatile register in the event that a determination is made that a function is rarely executed, or a non-volatile register of which register value is reserved during execution of the invoking of the function, depending on the execution frequency of said function, if said variable in said executable program lives before and after said predetermined function.

18. A computer readable recording medium in which a program for controlling a computer to allocate registers to variables in a predetermined executable program, said program executing the processes of:

examining an execution frequency of a function comprising said executable program, when said executable program is run, and storing said execution frequency in memory;

acquiring the information regarding an execution frequency of a function comprising said executable program when said executable program is run; and adding any one of two pieces of code to said executable program, when variables live across a predetermined invoking of functions, depending on execution frequency, said code comprising code for saving and restoring variables allocated to said register before and after invoking of functions in the event that a determination is made that said function has rarely been executed, and code for saving and restoring variables within invoked functions.

19. An article of manufacture comprising a computer usable medium having computer readable program code means embodied therein for causing program conversion the computer readable program code means in said article of manufacture comprising computer readable program code means for causing a computer to effect the steps of:

reading from memory said executable program to be an objective for processing, determining whether or not predetermined variables of said executable program live across undetermined invoking of a function, and determining whether said invoking of said function corresponds to invoking of a function generated by the compiler or corresponds to invoking of an external function if said variable lives across said invoking of said function;

determining based on determination resisters for allocation of said variables, a register being selected from:
  a volatile register of which register value is destructed during execution of said invoking of said function,
  a non-volatile register of which register value is reserved during execution of said invoking of said function, and
  a semi-volatile register of which register value is reserved during execution of said invoking of said external function and is destructed during execution of a function generated by said compiler, wherein an arbitrary number of said semi-volatile registers are created from a preexisting number of said non-volatile registers; and generating machine language code based on said determination to store in memory.

20. A program storage device readable by machine, tangibly embodying a program of instructions executable by the machine to perform method steps for program conversion said method steps comprising the steps of:

examining an execution frequency of a function comprising said executable program, when said executable program is run, and storing said execution frequency in memory;

reading from said memory said execution frequency of said function when a predetermined variable in said executable program lives across predetermined invoking of a function, and determining, depending on said execution frequency a volatile resister or a non-volatile register to which said variable is allocated, wherein said variable is allocated to said volatile register in the event that a determination is made that a function is rarely executed, and further said volatile register destroying a register value upon invoking of a function and said non-volatile register reserving a register value upon invoking of a function; and generating the machine language code in response to determined register allocation, and storing it in said memory.

21. A computer program product comprising a computer usable medium having computer readable program code means embodied therein for causing data processing the computer readable program code means in said computer program product comprising computer readable program code means for causing a computer to effect the functions of:

allocating logical registers to variables in said executable program;

analyzing whether or not predetermined variables live across predetermined invoking of functions, and when said variables live across said invoking of said functions, further analyzing whether or not said invoking of said functions is to be invoking of functions generated by said compiler or whether or not said invoking of said functions is to be invoking of external functions;

allocating said variables to registers, based on results from a logical register characteristics analysis part, said registers comprising volatile registers of which register values are destructed during execution of said invoking of said functions, non-volatile registers of which register values are reserved during execution of said invoking of said functions, and semi-volatile registers of which register values are reserved during execution of said invoking of said external functions or is destructed during execution of said invoking of functions generated by the compiler, wherein an arbitrary number of semi-volatile registers are created from a preexisting number of non-volatile registers; and generating machine language code by referring to said determination of the resistor allocation in said physical register allocation part.

* * * * *